(12) United States Patent
Kajita

(10) Patent No.: US 7,280,620 B2
(45) Date of Patent: Oct. 9, 2007

(54) ELECTRONIC DEVICE INCLUDING IMAGE FORMING APPARATUS

(75) Inventor: Koji Kajita, Ohta-ku (JP)

(73) Assignee: Canon Kabushiki Kaisha, Tokyo (JP)

(*) Notice: Subject to any disclaimer, the term of this patent is extended or adjusted under 35 U.S.C. 154(b) by 728 days.

(21) Appl. No.: 10/688,669

(22) Filed: Oct. 16, 2003

(65) Prior Publication Data

US 2004/0081234 A1    Apr. 29, 2004

(30) Foreign Application Priority Data

Oct. 18, 2002  (JP) ............................. 2002-304494

(51) Int. Cl.
*H04L 27/00* (2006.01)
*G06F 11/00* (2006.01)

(52) U.S. Cl. ........................... 375/324; 714/25
(58) Field of Classification Search ................ 375/224, 375/377; 713/375, 500; 710/62; 714/8–55; 370/402, 242
See application file for complete search history.

(56) References Cited

U.S. PATENT DOCUMENTS 4,228,496 A * 10/1980 Katzman et al. ............ 710/100
4,817,091 A * 3/1989 Katzman et al. ................ 714/8
5,689,689 A * 11/1997 Meyers et al. ............... 713/375
5,737,317 A    4/1998 Takayama
6,275,491 B1 * 8/2001 Prasad et al. ................ 370/389

FOREIGN PATENT DOCUMENTS

| JP | 2-153655 A | 6/1990 |
| JP | 4-100446 A | 4/1992 |
| JP | 2002-230536 A | 8/2002 |

* cited by examiner

*Primary Examiner*—Mohammed Ghayour
*Assistant Examiner*—Vineeta Panwalkar
(74) *Attorney, Agent, or Firm*—Canon U.S.A. Inc I.P. Div

(57) ABSTRACT

When a plurality of sub-processors are daisy chained in a loop, for example, to a main processor by a one-way bus, a command packet from the main processor addressed to itself is transmitted to the one-way bus which form a return path back to the main processor so as to easily specify a fault portion. If the command packet is returned to the main processor within a predetermined time, it is determined that no fault exists within the electronic device. When a fault exists, a test signal is transmitted to sub-processors via a dedicated signal line, separate from the one-way bus, to trigger a test packet that will be routed through the one way bus. The faulty portion in the electronic device is specified based on whether the test packet transmitted via the one-way bus in accordance with the test packet from each sub-processor is received within a predetermined time.

9 Claims, 14 Drawing Sheets

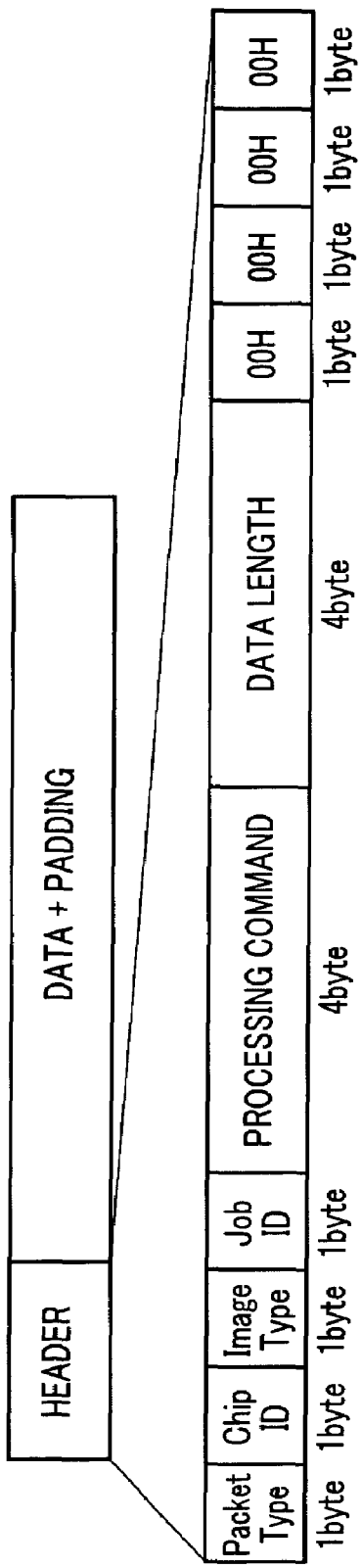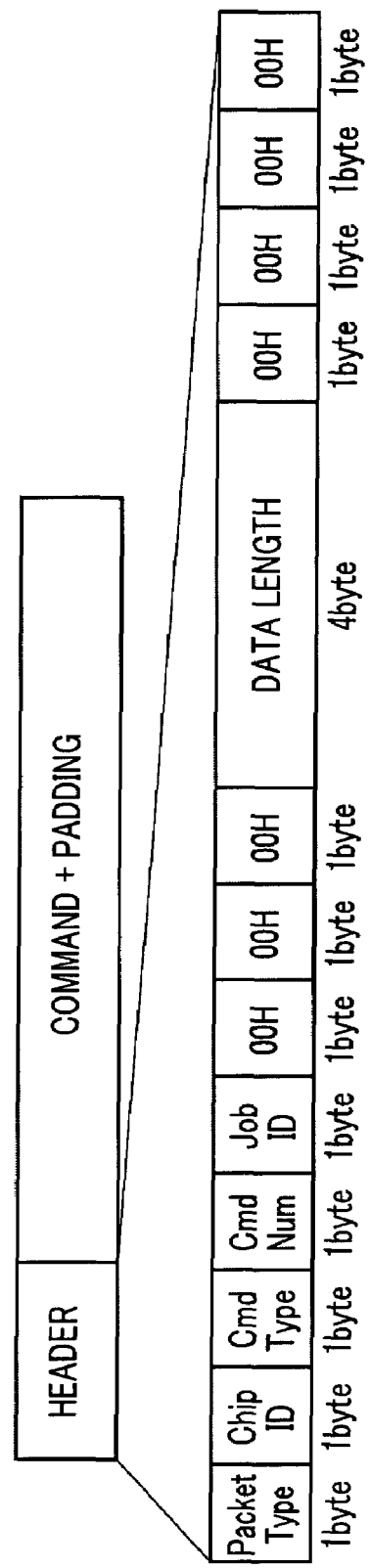

ELECTRONIC DEVICE INCLUDING IMAGE FORMING APPARATUS

BACKGROUND OF THE INVENTION

1. Field of the Invention

The present invention relates to a technology for the fault diagnosis of an electronic device including an image forming apparatus.

2. Description of the Related Art

Synchronous data transmission (uni-directional) is known and can be faster relative to asynchronous data transmission (bi-directional). Japanese Patent Laid-Open No. 2002-230536 discloses a dedicated data transfer method, by which the data transfer is fixedly in the one-way direction. This has the advantage that the serial bus reduces the number of signal lines and the physical connection between the devices becomes easy. Also, since the data transfer is in the one-way direction, the timing of an interface circuit is better designed.

Further, Japanese Patent Laid-Open No. 4-100446 discloses a data transfer system, wherein a network is switched to a backup network and a faulty device is disconnected when a packet error is detected. The disadvantage is that for an image forming apparatus, one portion of the image forming apparatus is disconnected and is not used.

Furthermore, Japanese Patent Laid-Open No. 02-153655 discloses use of a loop-back communication test in a communication control integrated circuit to determine whether the communication control integrated circuit has a fault. To specify the fault portion, the loop-back communication test is needed for an internal portion as well as for an external portion, which results in complicated control circuitry. In an apparatus which does not communicate with the external portion, it is too difficult to specify the fault portion.

As mentioned above, synchronous communication is important for improving the speed of data transfer. When this data transfer mode is used, and devices are daisy chained in loop, access to all the devices is cut off when a fault occurs. Therefore, a user can find only the existence of fault and, inconveniently, the extensive test using a dedicated measuring instrument is necessary for identifying the faulty portion.

A boundary scanning method is popular for fault diagnosis of devices in factories. However, the boundary scanning method is not suited to the self-diagnosis of devices for maintenance in the field. That is, the boundary scanning method needs a one-to-one correspondence between test data and the device and, upon changing the device, use of the test data must be changed accordingly. In self-diagnosis, the version of the device is checked and the test data suitable thereto is selected. However, since the device information is not readable because access to the device has been cut off, other ways such as using previously stored information is used. Since test data for boundary scanning is large (approximately 100 KB per LSI) pre-installing the test data is not cost effective.

Therefore, one advantage of the present invention is that it provides an electronic device in which, when a plurality of processors are connected in a loop, for example, by a one-way bus, a faulty portion in the structure is easily detected.

SUMMARY OF THE INVENTION

According to the present invention, there is provided an electronic device having connecting means for connecting, in a loop, a main control portion for controlling the electronic device and a plurality of sub-processing portions for executing specific functions, comprising: a signal line for transmitting a test signal from the main control portion to the sub-processing portions, different from the connecting means connected in the loop; a generating unit for generating predetermined packet data to the connecting means; sub-processing portions comprising a receiving and transmitting unit for receiving the packet data and transmitting it to the next portion; a determining unit for determining whether or not a fault exists at any portion in the electronic device in accordance with whether or not the sub-processing portion normally receives the packet data transmitted to the main control portion; a transmitting unit for transmitting the test signal to the sub-processing portions via the signal line in case that the determining unit determines that the fault exists; and a fault portion specifying unit for specifying a fault portion in the electronic device based on whether or not a test packet transferred via the connecting means is normally received, wherein the test packet is generated by the sub-processing portion in accordance with the test signal.

In addition, according to the present invention, there is provided an electronic device having connecting means for connecting, in a loop, a main control portion for controlling the electronic device and a plurality of sub-processing portions for executing specific functions, comprising: a signal line for transmitting a test signal from the sub-processing portions to the main control portion, different from the connecting means connected in the loop; a generating unit for generating predetermined packet data to the connecting means; sub-processing portions comprising a receiving and transmitting unit for receiving the packet data and transmitting it to the next portion; a determining unit for determining whether or not a fault exists at any portion in the electronic device in accordance with whether or not the sub-processing portion normally receives the packet data transmitted to the main control portion; a transmitting unit for transmitting a test packet to the connecting means in case that the determining unit determines that the fault exists; and a fault portion specifying unit for specifying a fault portion of the electronic device based on a state of the test signal transmitted via the corresponding signal line from the sub-processing portions in accordance with the test packet.

In addition, according to the present invention, there is provided an electronic device having connecting means a main control portion for controlling the device and a plurality of sub-processing portions for executing specific functions in a loop, comprising: a signal line for transferring a test signal, arranged between the sub-processing portion and the main control portion, different from the connecting means; a generating unit for generating predetermined packet data to the connecting means; sub-processing portions comprising a receiving and transmitting unit for receiving the packet data and transmitting it to the next portion; a determining unit for determining whether or not a fault exists at any portion in the electronic device in accordance with whether or not the sub-processing portion normally receives the packet data transmitted to the main control portion; and a fault portion specifying unit for specifying a fault portion in the electronic device via the corresponding signal line between the sub-processing portion and the main control portion in case that the determining unit determines that the fault exists.

Further, objects, features, and advantages of the present invention will become apparent from the following description of the preferred embodiments with reference to the attached drawings.

BRIEF DESCRIPTION OF THE DRAWINGS

FIG. 7A is a diagram showing an example of the structure of a data packet according to the first embodiment;

FIG. 7B is a diagram showing an example of the structure of a command packet according to the first embodiment;

DESCRIPTION OF THE PREFERRED EMBODIMENTS

Hereinbelow, preferred embodiments of the present invention will be described with reference to the drawings.

First Embodiment

Figure 1:
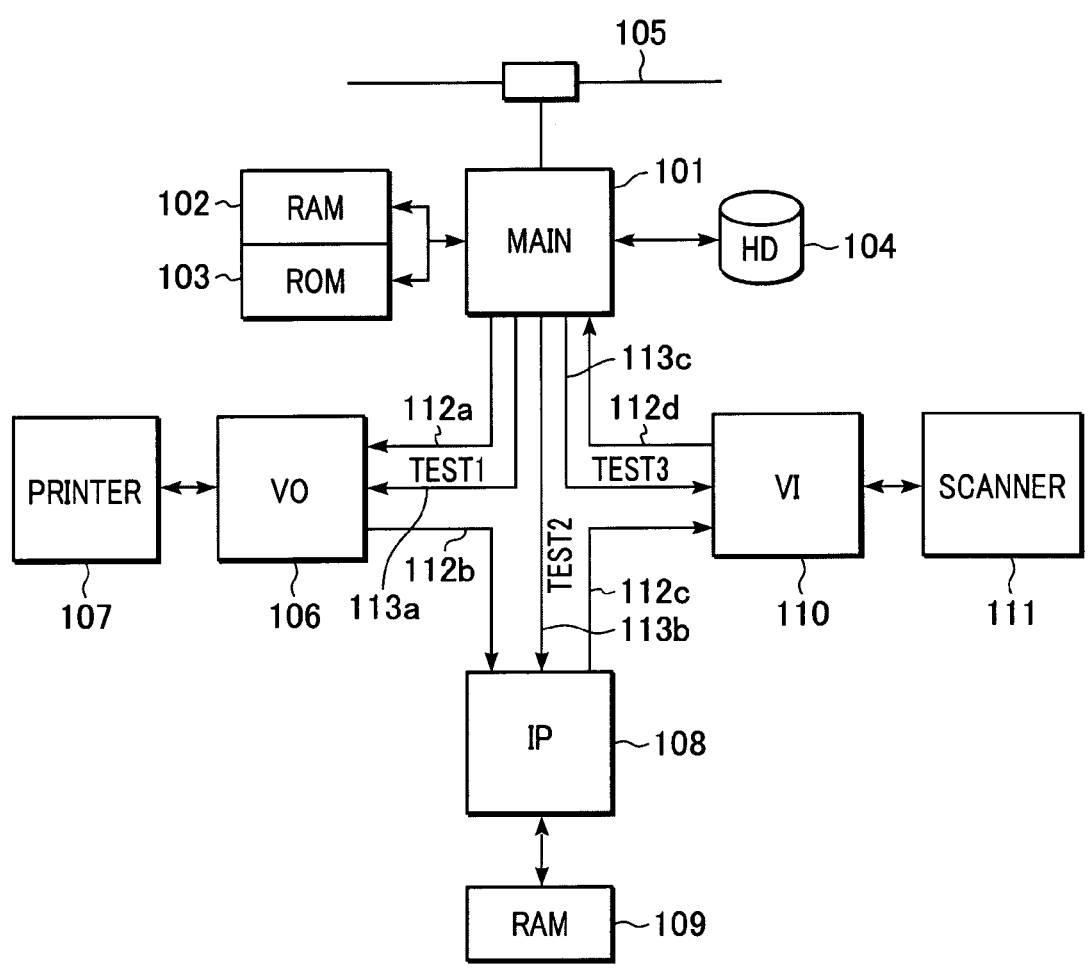
FIG. 1 is a diagram showing the structure of a digital color copying machine according to a first embodiment.

FIG. 1 is a diagram showing the structure of a digital color copying machine (image forming apparatus) as an electronic device according to a first embodiment of the present invention. Here, the digital color copying machine is described and, however, it is not limited to this and the electronic device may be a printer, a scanner, an image communication device for transmitting image data via a communication network, or a digital camera.

Referring to FIG. 1, reference numeral 101 denotes a main processor (hereinafter, referred to as a MAIN) for systematically controlling the digital color copying machine, reference numeral 102 denotes a synchronous dynamic memory (hereinafter, referred to as a RAM) which functions as a main memory of the MAIN 101, reference numeral 103 denotes a read only memory (hereinafter, referred to as a ROM) which stores a boot-up program, etc., and reference numeral 104 denotes a hard disk (hereinafter, referred to as an HD) which stores a control program, etc.

Reference numeral 105 denotes a local area network (hereinafter, referred to as a LAN) in conformity with Ethernet (registered trademark), reference numeral 106 denotes an image output processor (hereinafter, referred to as a VO) which executes a function for outputting image data to a printer, and reference numeral 107 denotes a printer unit.

Reference numeral 108 is an imaging processor (hereinafter, referred to as an IP) for the rotation of image, the enlargement and reduction of the image, and for color correction. Reference numeral 109 denotes a synchronous dynamic memory (hereinafter, referred to as a RAM) having a function as a work memory for image processing in the IP 108, reference numeral 110 denotes an image input processor (hereinafter, referred to as a VI) having a function for inputting the image data from a scanner unit 111, and reference numeral 111 denotes a scanner unit.

The VO 106, IP 108, and VI 110 are sub-processors which execute the specific functions to the MAIN 101. The MAIN 101, the VO 106, the IP 108, and the VI 110 are connected in a loop by a one-way serial bus (hereinafter, simply referred to as a serial bus), and the data is transmitted between the processors. Referring to FIG. 1, the MAIN 101 is connected to the VO 106 by a serial bus 112a through which a signal is transmitted from the MAIN 101 to the VO 106, the VO 106 is connected to the IP 108 by a serial bus 112b through which the signal is transmitted from the VO 106 to the IP 108, the IP 108 is connected to the VI 110 by a serial bus 112c through which the signal is transmitted from the IP 108 to the VI 110, and the VI 110 is connected to the MAIN 101 by a serial bus 112d through which the signal is transmitted from the VI 110 to the MAIN 101.

According to the first embodiment, signal lines 113a, 113b, and 113c for transmitting test signals which will be described later are further connected from the MAIN 101 to the sub-processors, namely, to the VO 106, the IP 108, and the VI 110. The signal lines 113a to 113c are connected independently of the serial buses.

With the above structure, the MAIN 101 converts the image data held on the RAM 102 into packet data and transfers it to the VO 106, thus outputting the data by the printer unit 107 and forming the image. The image data held on the RAM 102 is transferred to the IP 108 and is subjected to the image processing, thereby rotating, enlarging, and reducing the image and correcting the color of the image. Further, the MAIN 101 receives scanning image data of the scanner unit 111 received by the VI 110 and stores it on the RAM 102. Furthermore, the MAIN 101 communicates, via the LAN 105, with another device such as a computer on the network.

The MAIN 101, the VO 106, the IP 108, and the VI 110 are very-large-scale integrated circuits (VLSIs) and the detailed description is given of them hereinbelow.

Figure 2:
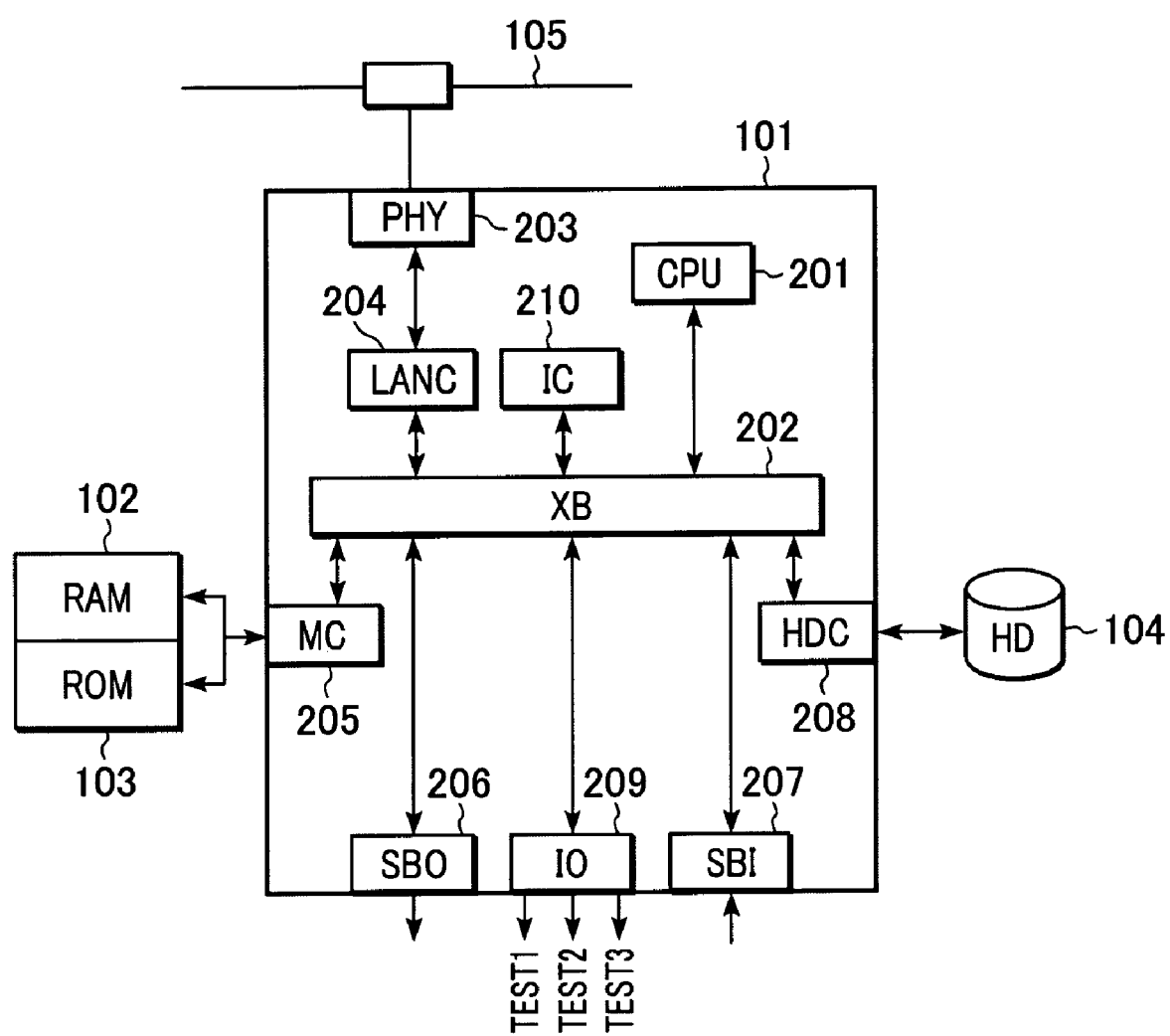
FIG. 2 is a diagram showing the structure of a main processor according to the first embodiment.

The MAIN 101 has the internal structure as shown in FIG. 2.

Reference numeral 201 denotes a CPU, reference numeral 202 denotes a cross bar switch (hereinafter, referred to as XB), reference numeral 203 denotes a physical-layer interface (hereinafter, referred to as a PHY) for connection to a physical layer of Ethernet, reference numeral 204 denotes a LAN controller (hereinafter, referred to as a LANC) for communication on the local area network, reference numeral 205 denotes a memory controller (hereinafter, referred to as MC), reference numeral 206 denotes a serial bus output interface (hereinafter, referred to as SBO), reference numeral 207 denotes a serial bus input interface (hereinafter, referred to as SBI), reference numeral 208 denotes a hard disk controller (hereinafter, referred to as an HDC), reference numeral 209 denotes an input/output port (hereinafter, referred to as an I/O), and reference numeral 210 denotes an interrupt controller (hereinafter, referred to as an IC).

The CPU 201 controls overall operation of the apparatus by executing program code held in the ROM 103 and the RAM 102. The ROM 103 stores the boot-up program, and the CPU 201 starts to execute contents of the ROM 103 upon starting the apparatus. A control program stored in the HD 104 is loaded to the RAM 102 and the boot-up program jumps the control program, thereby starting the execution of the control program.

The XB 202 transfers the data between the units in the MAIN 101 in accordance with address spaces allocated to the units. Further, the XB 202 has an arbitrating function upon the simultaneous access of a plurality of units.

The LANC 204 and the PHY 203 have a function for communication with other devices via the network. The MC 205 controls the access to the RAM 102 and the ROM 103. The SBO 206 is an interface circuit for outputting data of the serial bus, converts the data stored in the RAM 102 into predetermined packet data, and transmits the converted packet data. The SBI 207 is a serial bus input interface, which converts the received packet data into internal data, and transfers the converted data to a predetermined unit.

The HDC 208 is a control circuit for inputting and outputting data of the HD 104, and controls the hard disk by, e.g., an Ultra DMA method. The HD 104 has function for storing program data executed by the CPU 201 and storing the image data stored on the RAM 102. The I/O 209 is an input/output port and has three output ports for TEST1, TEST2, and TEST3 signals according to the first embodiment which are transferred via the signal lines 113a, 113b, and 113c. At the three output ports, the CPU 201 sets the logical level of the TEST1, TEST2, and TEST3 signals to the H/L level.

The IC 210 is a unit which processes the interrupt in the MAIN 101, collects information on the interrupts caused in the units of the portions and on an interrupt packet received by the SBI 207, and notifies the information to the CPU 201.

Figure 3:
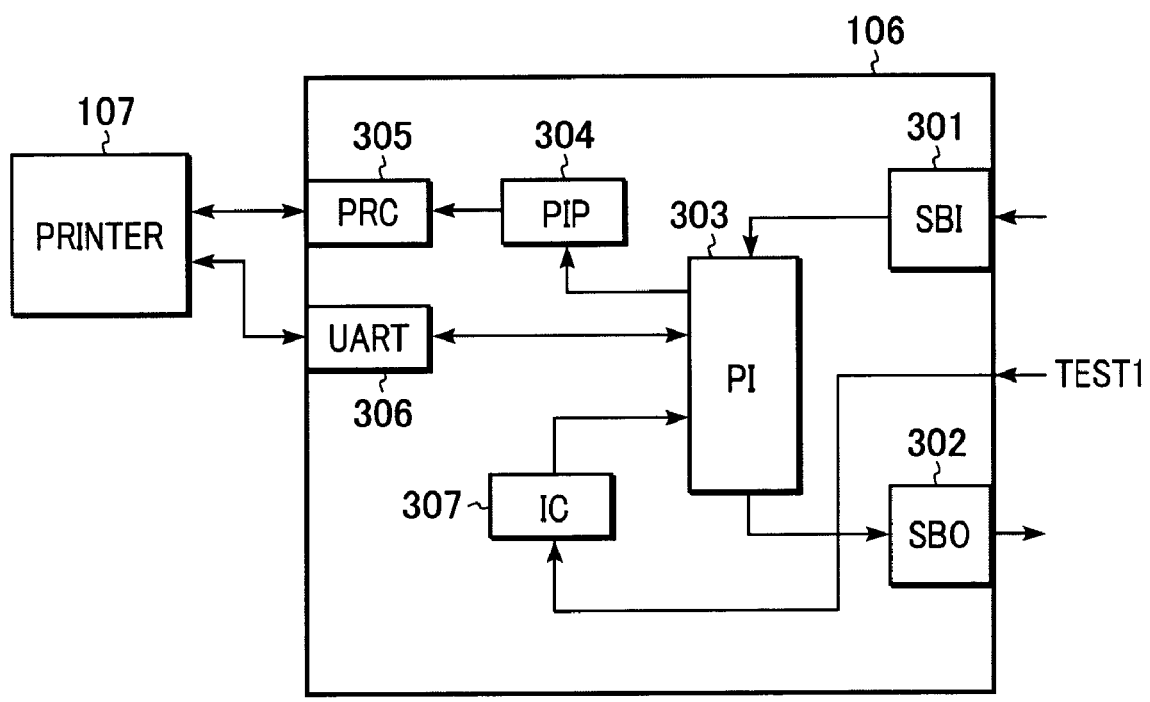
FIG. 3 is a diagram showing the structure of an image output processor according to the first embodiment.

FIG. 3 is a diagram showing the structure of the VO 106.

Referring to FIG. 3, reference numeral 301 denotes a serial bus input interface (hereinafter, referred to as an SBI), reference numeral 302 denote a serial bus output interface (hereinafter, referred to as an SBO), reference numeral 303 denotes a packet interpreter (hereinafter, referred to as a PI), reference numeral 304 denotes an image processing unit for printer (hereinafter, referred to as a PIP) for printer, reference numeral 305 denotes a printer output interface (hereinafter, referred to as a PRC), reference numeral 306 denotes a serial communication unit (hereinafter, referred to as a UART), and reference numeral 307 denotes an interrupt controller (hereinafter, referred to as an IC).

The SBI 301 and the SBO 302 basically has the same functions as those incorporated in the MAIN 101. The PI 303 is a unit which determines which is the packet data received via the SBI 301 from the serial bus 102a, and determines whether the packet data is the command packet, the data packet, or the interrupt packet, as will be described later. The PI 303 determines whether or not the received packet data is for the VO 106 and further determines whether or not it is for the unit in the VO 106. When the received packet data is for another processor, the PI 303 promptly transmits the packet data from the SBO 302 to the serial bus 102b, and further transmits it to the next unit (namely, the IP 108).

When the received packet is a command packet indicating a command to a unit in the VI 301, the register in the unit reads/writes the data. When the received packet is the data packet for the PIP 303, the image data as contents of the data packet is transferred to the PIP 304. The PIP 304 converts the received image data into data suitable for the output by the printer unit 107, the PRC 305 transfers the data to the printer unit 107, and it executes the printing operation.

The PIP 304 has a function for converting a received RGB image into CMYK-color data and a γ curve converting function for correcting the property of the printer unit 107. The PRC 305 has functions for converting the image data into data at the operating speed of the printer unit 107 and outputting it. The UART 306 is a unit for communication with the printer unit 107, and detects a state of the printer unit 107 and instructs the printing operation.

An IC 307 detects an interrupt factor in the VO 106 and instructs the generation of the interrupt packet to the PI 303. The generated interrupt packet is transmitted to the next processor via the SBO 302. The interrupt factor of the IC 307 is cleared and is masked depending the command packet. The IC 307 receives the TEST1 signal from the MAIN 101 and, then, instructs the generation of an interrupt packet for test to the PI 303, which will be described later. Consequently, even in a state in which the data is not read/written to the registers of the units in the VO processor and the command packet is not received, the interrupt packet for test is generated and is transmitted to the serial bus. Therefore, in the case in which the abnormal state occurs in the VO processor and the command packet is not outputted to the IP 108, the VI 110, and the MAIN 101 at the latter stage, it is checked to see if the communication interface normally functions with the IP 108, the VI 110, and the MAIN 101 at the latter stage.

Figure 4:
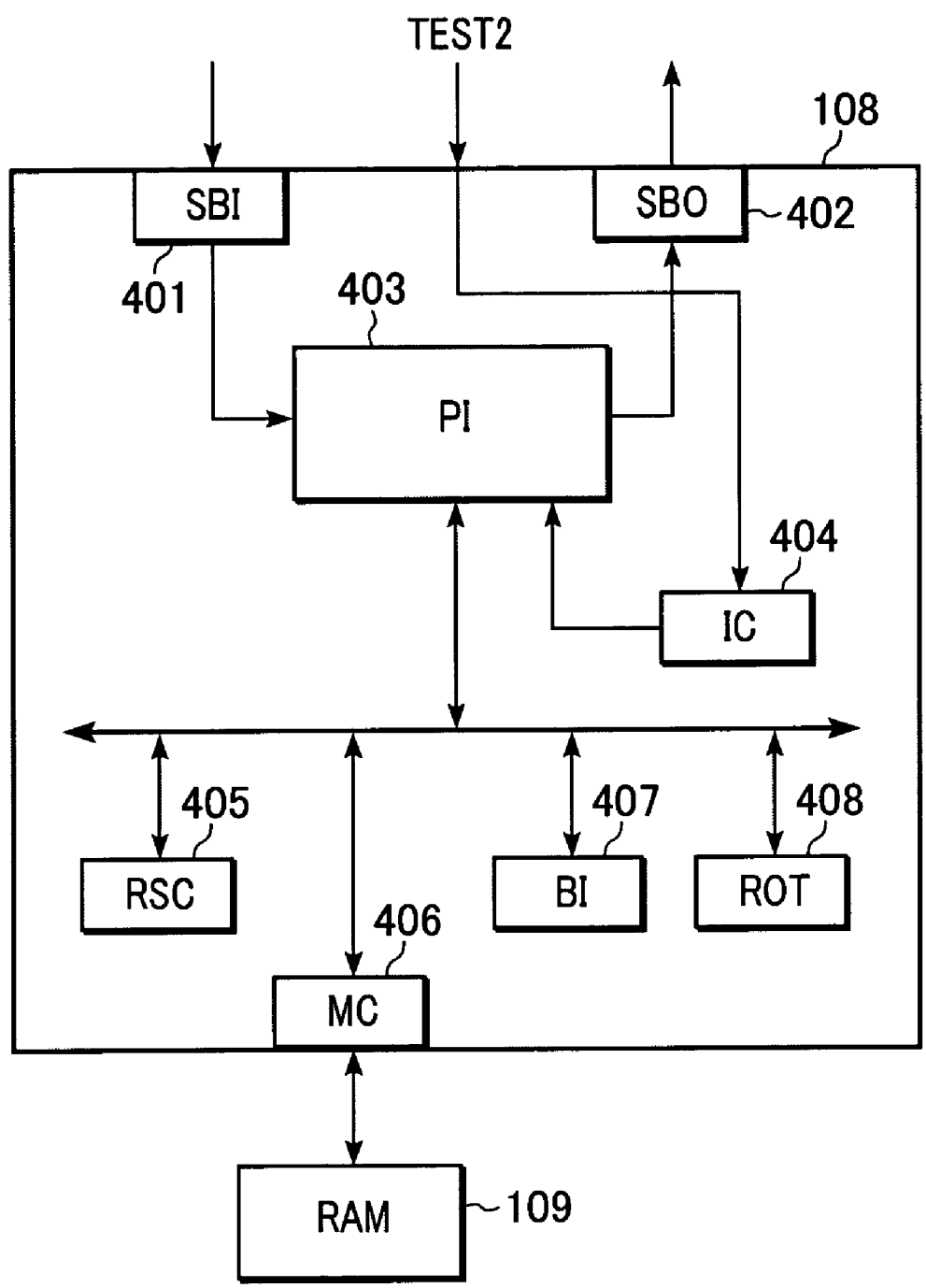
FIG. 4 is a diagram showing the structure of an imaging processor according to the first embodiment.

FIG. 4 is a diagram showing the structure of the imaging processor IP 108.

Reference numeral 401 denotes a serial bus input interface (hereinafter, referred to as an SBI), reference numeral 402 denotes a serial bus output interface (hereinafter, referred to as an SBO), reference numeral 403 denotes a packet interpreter (hereinafter, referred to as a PI), reference numeral 404 denotes an interrupt controller (hereinafter, referred to as an IC), reference numeral 405 denotes a resolution converting unit (hereinafter, referred to as an RSC), reference numeral 406 denotes a memory controller (hereinafter, referred to as an MC), reference numeral 407 denotes a binarizing unit (hereinafter, referred to as a BI), and reference numeral 408 denotes a rotating unit (hereinafter, referred to as an ROT).

The SBI 401, the SBO 402, and the PI 403 have the same functions as those of the VO 106. When the received packet data is the command packet for the unit in the IP 108, the PI 403 reads/writes the data in the register in the unit. When the received packet data is the data packet for the unit in the IP 108, the PI 403 transmits the data to the unit and further transmits, from the SBO 402, the data which is processed by the unit and is returned.

The RSC 405 converts the resolution of the data, thereby enlarging or reducing the data. The MC 406 is a unit which controls the access to the RAM 109, and enables the unit in the IP 108 to use the RAM 109 as a work area.

The BI 407 has a function for halftone processing of multi-value data and converting the processed data into binary data. The function of the BI 407 is mainly used upon binarizing the scanned image before transferring it to the computer.

The ROT 408 executes the rotation of the image, and has a function for rotating the input image data by an angle of 90° on the unit basis and generating a new packet.

The IC 404 detects the interrupt factor caused in the IP 108, and instructs the generation of the interrupt packet to the PI 403. The IC 404 receives the TEST2 signal from the MAIN 101 and, then, instructs the generation of the interrupt packet for test to the PI 403, which will be described later.

Consequently, even in a state in which the data is not read/written to the registers of the units in the IP processor and the command packet is not received, the interrupt packet for test is generated and is transmitted to the serial bus. Therefore, in the case in which the abnormal state occurs in the IP processor and the command packet is not outputted to the VI 110 and the MAIN 101 at the latter stage, it is checked to see if the communication interface normally functions with the VI 110 and the MAIN 101 at the latter stage.

Figure 5:
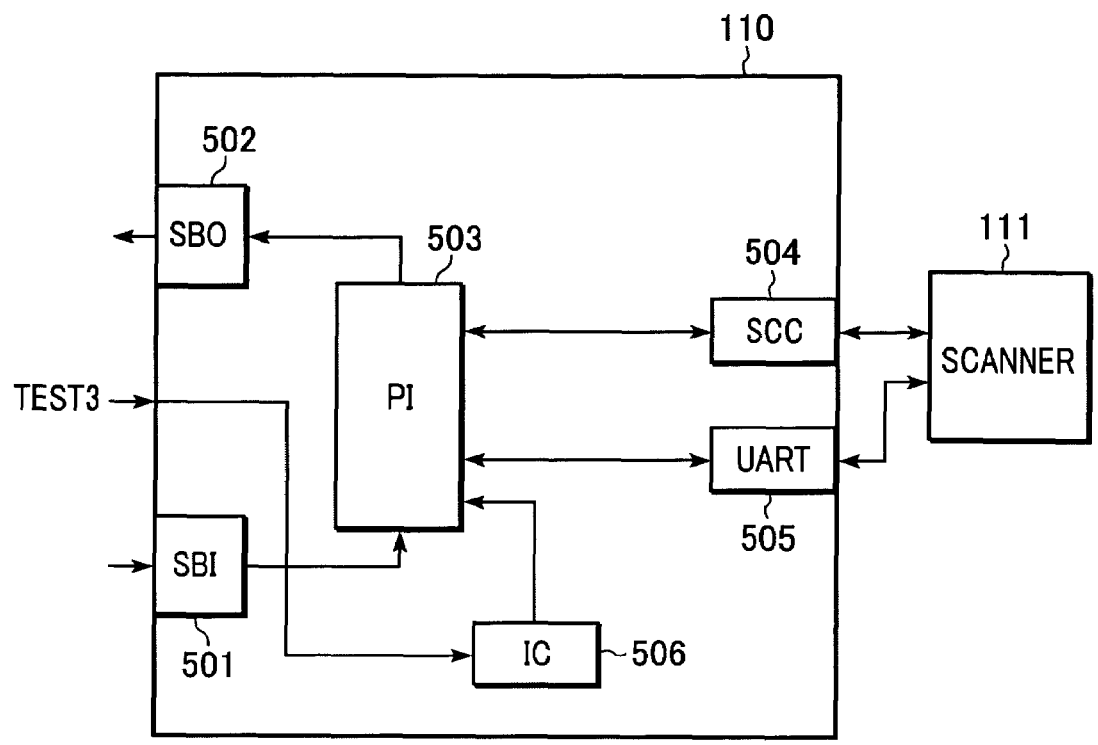
FIG. 5 is a diagram showing the structure of an image input processor according to the first embodiment.

FIG. 5 is a diagram showing the structure of the VI 110.

Reference numeral 501 denotes a serial bus input interface (hereinafter, referred to as an SBI), reference numeral 502 denotes a serial bus output interface (hereinafter, referred to as an SBO), reference numeral 503 denotes a packet interpreter (hereinafter, referred to as a PI), reference numeral 504 denotes a scanner input interface (hereinafter, referred to as an SCC), reference numeral 505 denotes a serial communication controller (hereinafter, referred to as a UART), and reference numeral 506 denotes an interrupt controller (hereinafter, referred to as an IC).

The SBI 501, the SBO 502, the PI 503, and the IC 506 have the same functions as those of the VO 106. The SCC 504 is an interface which receives the image data transmitted from the scanner unit 111 and transmits it to the PI 503. The PI 503 converts the received data into the data packet, and transmits the converted data from the SBO 502. The UART 505 communicates with the scanner unit 111. The IC 506 receives the TEST3 signal from the MAIN 101 and, then, instructs the generation of the interrupt packet for test to the PI 503, which will be described later.

Consequently, even in a state in which the data is not read/written to the registers of the units in the VI processor and the command packet is not received, the interrupt packet for test is generated and is transmitted to the serial bus. Therefore, in the case in which the abnormal state occurs in the VI processor and the command packet is not outputted to the MAIN 101 at the latter stage, it is checked to see if the communication interface normally functions with the MAIN 101 at the latter stage.

Figure 6:
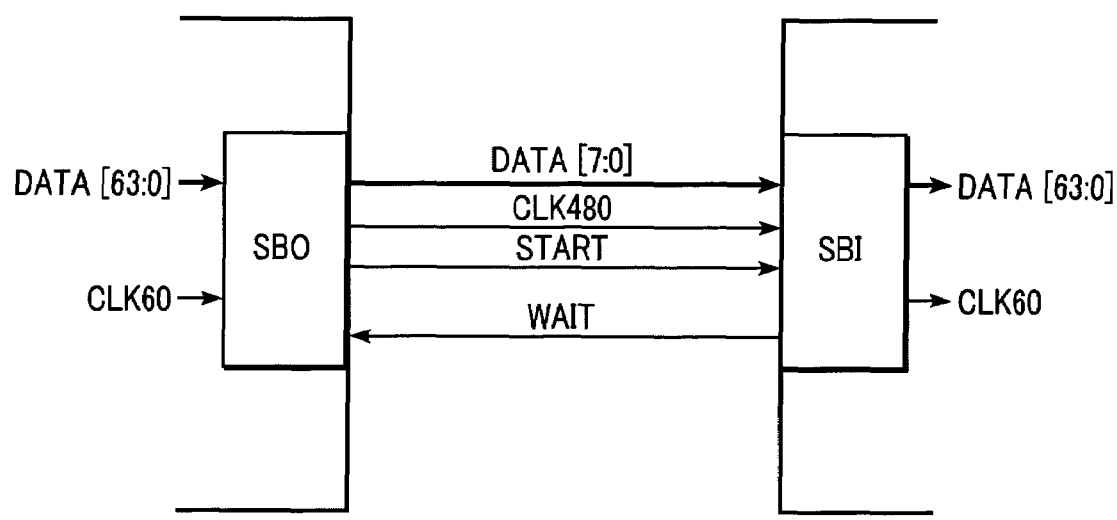
FIG. 6 is a diagram showing the structure of an interface between the processors according to the first embodiment.

Next, the structure of the serial bus will briefly be described. FIG. 6 shows the structure of the serial bus for connecting the SBO 502 in the processors and the SBI 501 in the processor next thereto.

Synchronously to a clock (hereinafter, referred to as a CLK) 60 (60 MHz), data having a 64-bit width is transmitted to the SBO 502 in the processor. The SBO 502 converts the CLK 60 into a CLK 480 (480 MHz) by multiplying the CLK 60 by eight and transmits the serial data having the data width on 8-bit unit basis. That is, the number of CLKs is eight times and the data width is ⅛ and, therefore, the data transfer speed in the processor is the same as that on the serial bus. A START signal is a signal indicating the head of the packet data.

The SBI 501 detects the START signal, then, fetches the data synchronously to the CLK 480, returns it to 64-bit data synchronous to the CLK 60 (60 MHz) therein, and transfers the 64-bit data to the processor. Referring to FIG. 6, a WAIT signal is asserted when the SBI 501 temporarily does not receive the packet data due to some factor. During asserting the WAIT signal, the SBO 502 stops the output. The SBO 502 and the SBI 501 include a buffer in which the buffer overflow is prevented while controlling the WAIT signal.

Figure 7C:
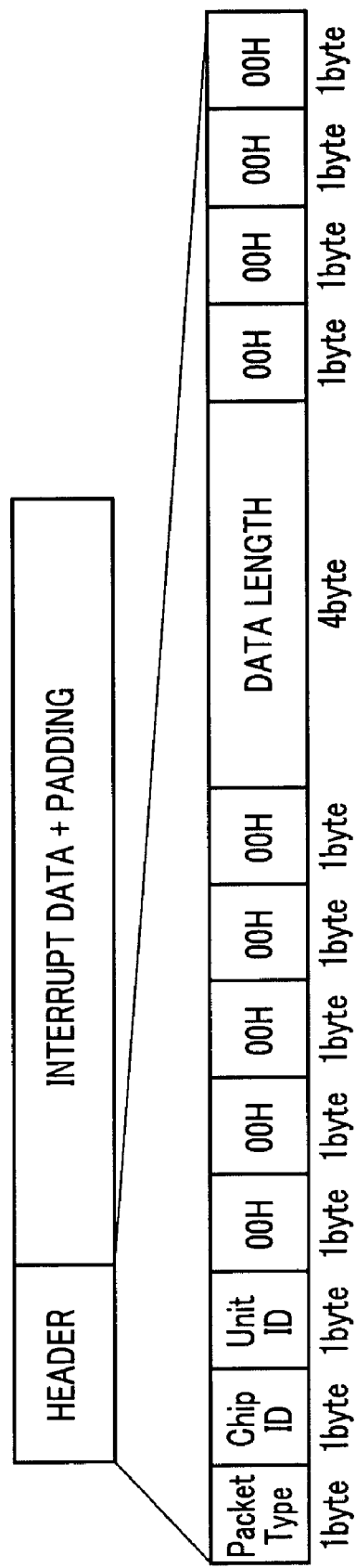
FIG. 7C is a diagram showing an example of the structure of an interrupt packet according to the first embodiment.

Next, the format of packet data will be described. FIG. 7A is a diagram showing the structure of the data packet, FIG. 7B is a diagram showing the structure of the command packet, and FIG. 7C is a diagram showing the structure of the interrupt packet. In any packet, 16-byte data is a header portion indicating the property of the packet, and sequentially continues to the data portion.

Referring to FIG. 7A, the header portion in the data packet contains, starting from the head, s packet type, s chip ID, an image type, a job ID, s processing command, and a data length.

The packet type identifies the format of packet data. For example, reference numeral 00H denotes the data packet, reference numeral 01H denotes the command packet, and reference numeral 02H denotes the interrupt packet.

The chip ID indicates to which processor the packet data is addressed. Since the chip IDs are individually allocated to the processors, each processor determines that the packet data addressed thereto by checking the property of the chip ID.

The image type indicates the property of the image data included in the data packet, reference numeral 00H denotes an RGB color image having 24 bits, reference numeral 01H denotes a monochrome image having 8 bits, and reference numeral 02H denotes a YUV color image.

With respect to the job ID, upon dividing the large-sized data into a plurality of pieces of packet data and processing them, the same job ID is allocated to the same data so as to identify the same data.

The processing command indicates the property for prescribing which of the units in the processors performs which processing. For example, when the IP 108 executes the resolution conversion, the processing command designates the unit number and the processing mode of the RSC 405, thereby executing a predetermined operation.

The data length is a field indicating the actual data length after the header portion. The data length of the data packet is indicated by an integer multiple of 16 bytes, and the remainder is set as padding. The SBOs 206, 302, 402, and 502 in each processor performs the processing so that the data length is the multiple of 16 bytes by adding the data 00H.

In the case of the command packet shown in FIG. 7B, as mentioned above, the packet type indicates 01H, the chip ID indicates the same meaning as that of the data packet. In the fields of the command type (hereinafter, referred to as a CMD TYPE) and the command number (hereinafter, referred to as a CMD NUM), the command packet instructs the command for the processor. The CMD TYPE indicates the execution of the writing operation in the case of the packet type 00H and of the reading operation in the case of the packet type 01H. The CMD NUM indicates the number of commands in the data portion. In accordance with the CMD NUM, a pair of the address and the data of the register which should read/write the data is written to the data portion. The command portion is an integer multiple of 16 bytes and a short portion of the integer multiple has padding of 00H by using the SBOs 206, 302, 402, and 502.

The interrupt packet shown in FIG. 7C indicates the packet type 02H, and includes the chip ID of the processor having the interrupt and the unit ID having the interrupt in the header portion. Only the MAIN 101 processes the interrupt packet and, therefore, the chip ID of the header portion indicates not the address but the processor having the interrupt. The field of a factor register of the unit indicating the interrupt contents is usually copied to the data portion. The interrupt data portion is an integer multiple of 16 bytes, and a short portion of the integer multiple has the padding of 00H by the SBOs 206, 302, 402, and 502.

According to the first embodiment, the structure of the digital color copying machine is as mentioned above. Next, a detailed description is given of fault diagnosis processing of the digital color copying machine as the electronic device according to the first embodiment.

Figure 9:
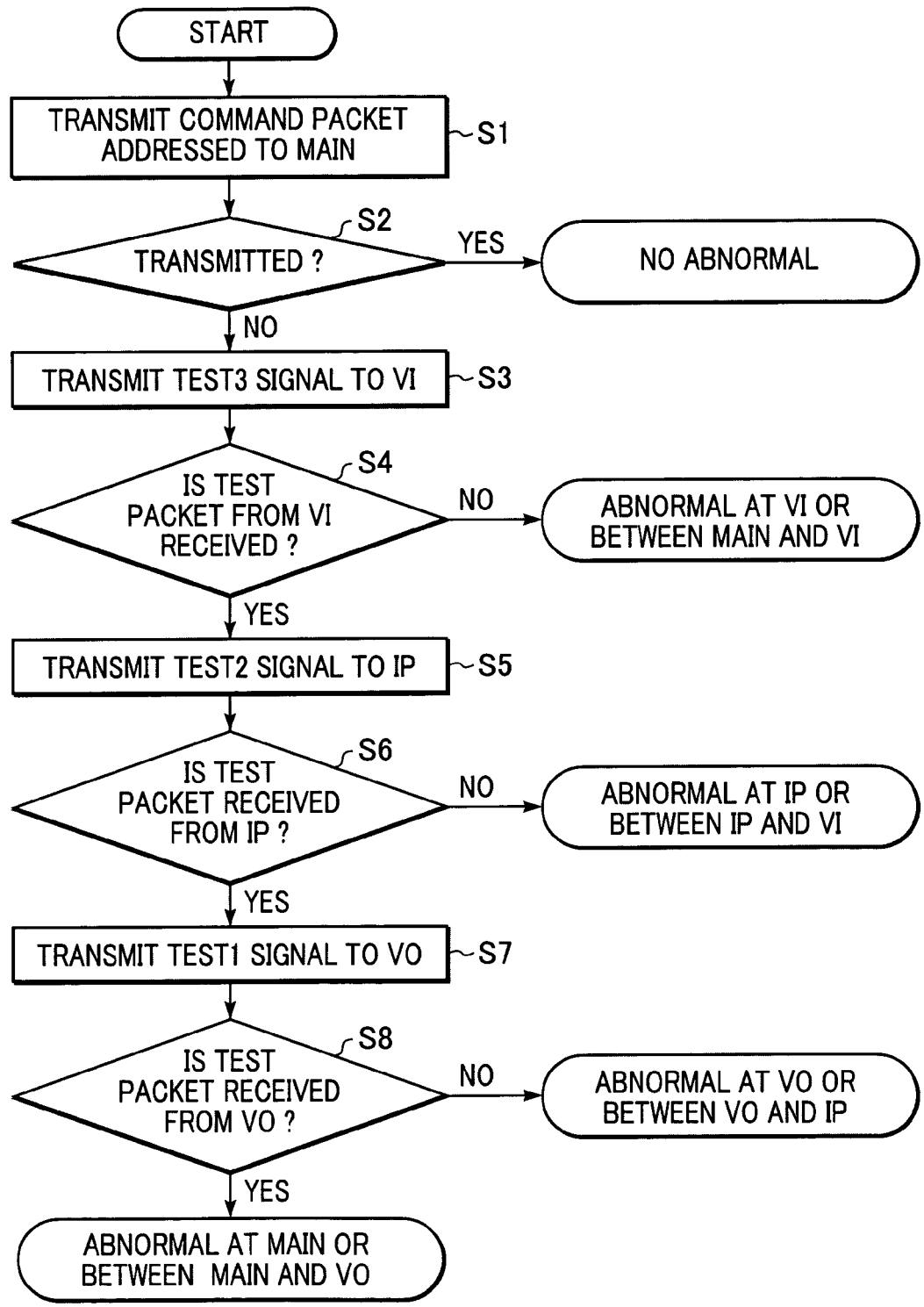
FIG. 9 is a flowchart showing fault diagnosis processing according to the first embodiment.

FIG. 9 is a flowchart showing the fault diagnosis processing according to the first embodiment. A program corresponding to the flowchart shown in FIG. 9 is included in the program stored in the HD 104, is loaded to the RAM 102, and is executed by the CPU 201 in the MAIN 101.

The MAIN 101 transmits the command packet addressed thereto from the SBO 206 to the serial bus 112*a* (step S1). In place thereof, the MAIN 101 may transmit the command packet for setting the chip ID which does not exist on the serial bus loop. When the circuit connection is not abnormal, the processor other than the MAIN 101 doesn't recognize the packet addressed thereto. Then, the packet data is transmitted to the next processor and, therefore, the packet data is to be returned to the SBI 207 of the MAIN 101.

It is determined whether or nor the transmitted packet data is normally returned (step S2). If the transmitted packet data is normally returned, it is determined that it is "no abnormal", i.e. normal. If the transmitted packet data is not normally returned either because the packet data is broken, or a processor or the serial bus is faulty, then this case is abnormal. Note that as an example, the terms "normal" or "abnormal" relates to whether the transmitted packet is returned to the main processor within a predetermined time. Other examples of what relates to "normal" and "abnormal" are possible. In the abnormal case, the processing sequence of moves to step S3, where a test signal, TEST3 signal from the I/O port 209 is asserted to the VI 110 at the most downstream position of the serial bus loop starting from the MAN 101 (step S3).

The IC 506 of the VI 110 receives the TEST3 signal and, then, instructs the PI 503 to generate the predetermined interrupt packet for test (hereinafter, simply referred to as a "test packet") as mentioned above. As a result, the VI 110 transmits the test packet to the serial bus 112*d*.

Figure 8:
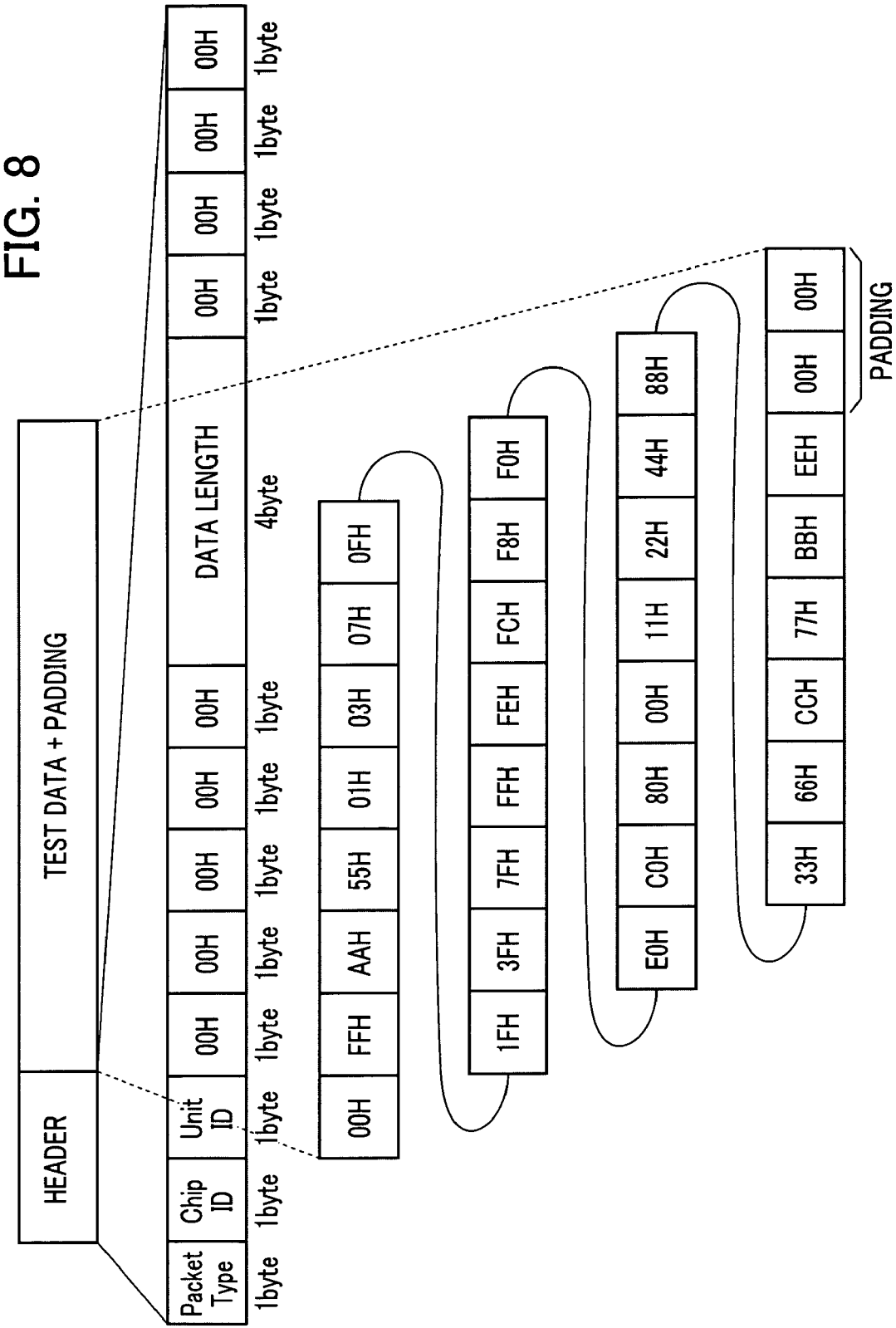
FIG. 8 is a diagram showing an example of the structure of an interrupt packet for test according to the first embodiment.

FIG. 8 shows an example of the data structure of the interrupt packet for test. The structure of the interrupt packet is the same as that shown in FIG. 7C. However, the data embedded in the data portion is not data on the actual interrupt but the test data for the data signal having 8 bits on the serial bus. That is, the data portion comprises the test data which determines that the signal changes to 1 or 0 corresponding to the 8 bits of the data signal and that the data signals are transmitted normally.

The MAIN 101 determines whether or not the test packet is normally received from the VI 110 (for example, whether or not it is received for a predetermined time) (step S4). When the test packet is not received for the predetermined time, it is determined that the operation of the VI 110 or the connection between the MAIN 101 and the VI 110 is abnormal. When the test packet is received for the predetermined time, the chip ID and the unit ID of the interrupt packet is stored in the register of the IC 210. The data portion is stored at a predetermined address in the RAM 102. After that, the interrupt is notified to the CPU 201. The CPU 201 receives the interrupt packet and, then, checks the chip ID, the unit ID, and the data of the data portion of the processor in which the interrupt packet is caused. Thus, the CPU 201 confirms that the VI 110 normally transmits the interrupt packet for test and that at least the connection between the VI 110 and the MAIN 101 and the operation of the VI 110 is normal. In this case, the processing sequence advances to step S5.

In step S5, the TEST2 signal of the I/O 209 is asserted and, in accordance therewith, it is determined whether or not the test packet to be transferred from the IP 108 is received for a predetermined time (step S6). When it is determined that the test packet is not received for the predetermined time, it is determined that the operation of the IP 108 or the connection between the VI 110 and the IP 108 is abnormal. When it is determined that the test packet is received normally for the predetermined time, the operation of the IP 108 or the connection between the VI 110 and the IP 108 is not abnormal. The processing sequence advances to step S7.

In step S7, the TEST1 signal of the I/O 209 is asserted and, in accordance therewith, it is determined whether or not the test packet to be transferred from the VO 106 is received for a predetermined time (step S8). When it is determined that the test packet is not received for the predetermined time, it is determined that the operation of the VO 106 or the connection between the IP 108 and the VO 106 is abnormal. When it is determined that the test packet is received for the predetermined time, it is determined that the operation of the MAIN 101 or the connection between the VO 106 and the MAIN 101 is abnormal.

In the above-mentioned fault diagnosis processing, depending on whether or not to receive, for a predetermined time, the test packet to be transferred via the one-way serial bus from the sub-processor in accordance with the test signal transferred via the dedicated signal line from the main processor, the fault portion is specified in the electronic device. The test signal may be transmitted in any order. However, as mentioned above, it is efficient that the fault portion is specified by sequentially testing the sub-processors starting from one at the most downstream of the bus loop having the main processor at the start point.

Consequently, even in a state in which the sub-processor does not transmit the command packet from the MAIN 101 to the unit at the latter stage via the serial bus, the interrupt packet for test is generated in the sub-processor in accordance with the instruction of the MAIN 101 via the signal line and it is transmitted to the serial bus. Therefore, the interrupt packet for test is transmitted to the serial bus at the latter stage and thus it is checked to see if the communication interface normally functions with the processor at the latter stage and the abnormal state is specified.

Second Embodiment

According to the first embodiment, the sub-processors transmit the test packet to the serial bus in accordance with the test signal transferred via the dedicated signal line from the main processor. Advantageously, with a contrary relationship between the test signal from the main processor and the test packet from the sub-processor, the sub-processor transmits the test signal via the dedicated signal line to the main processor in accordance with the test packet transferred from the main processor to the serial bus.

The structure will be described in detail with reference to the drawings. In the following drawings, the same portions as those according to the first embodiment are designated by the same reference numerals, they are not described, and only different portions are described.

Figure 10:
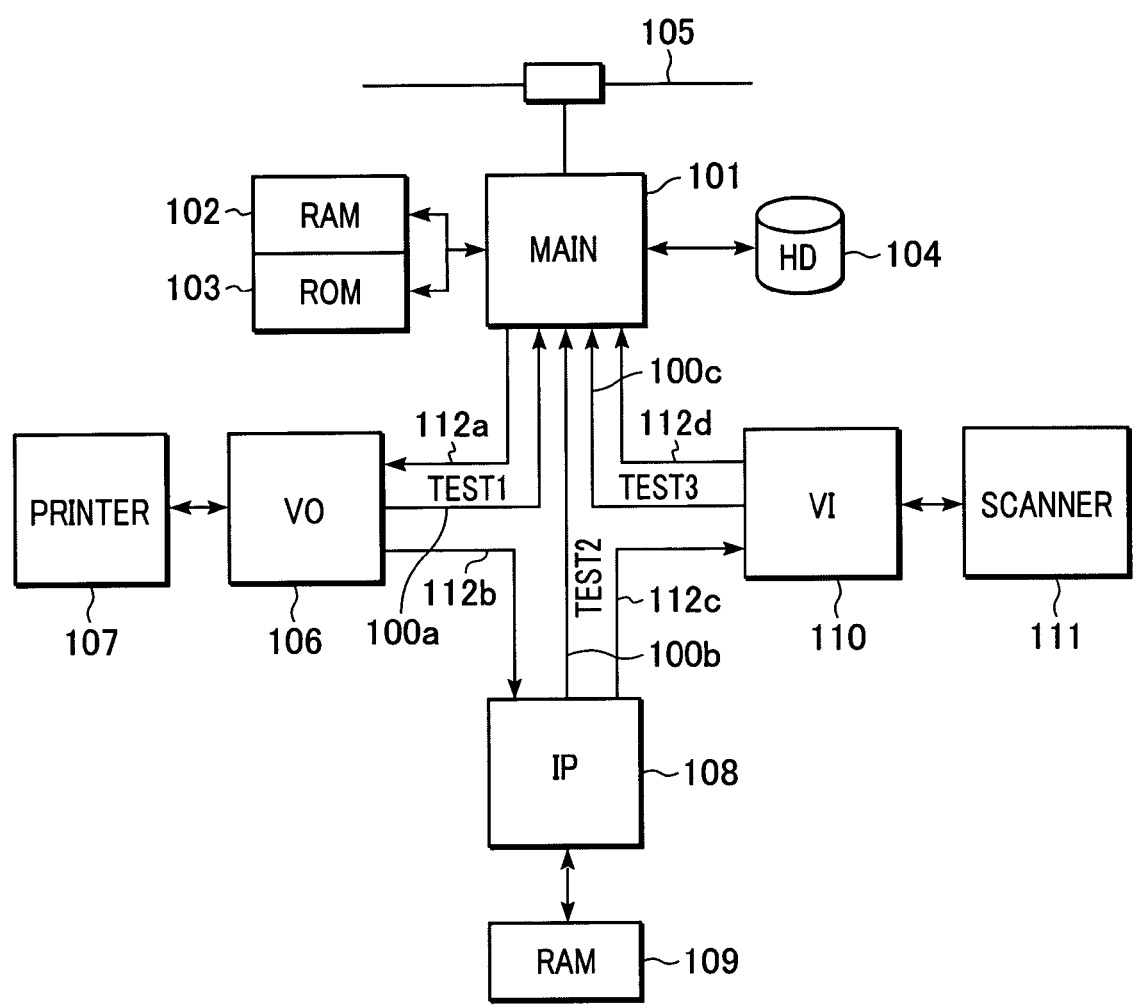
FIG. 10 is a diagram showing the structure of a digital color copying machine according to a second embodiment.

FIG. 10 is a diagram showing the structure of a digital color copying machine according to the second embodiment, corresponding to FIG. 1. The signal lines 113*a*, 113*b*, and 113*c* shown in FIG. 1 are signals lines to the corresponding sub-processors from the MAIN 101. On the other hand, signal lines 100a, 100b, and 100c shown in FIG. 10 are signals lines from the corresponding sub-processors to the MAIN 101.

Figure 11:
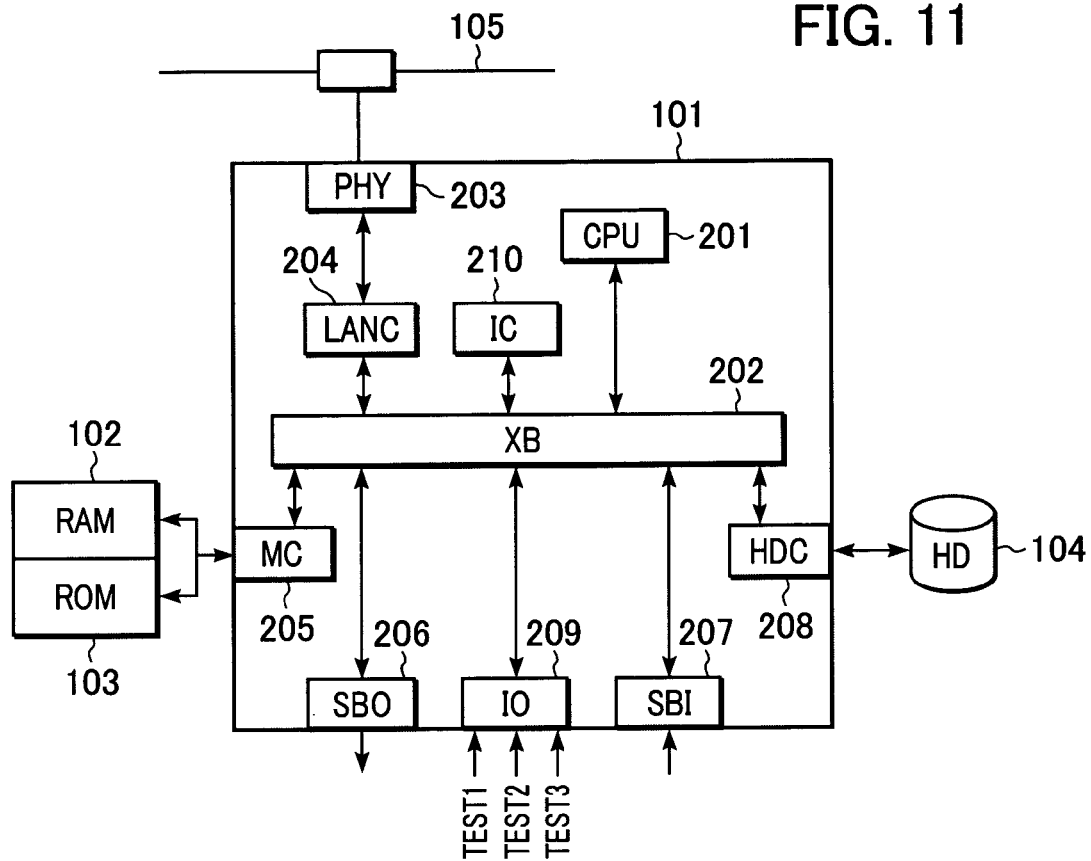
FIG. 11 is a diagram showing the structure of a main processor according to the second embodiment.

FIG. 11 is a diagram showing the internal structure of the MAIN 101 according to the second embodiment, corresponding to FIG. 2. The I/O 209 has three input ports of the TEST1, TEST2, and TEST3 signals.

Figure 12:
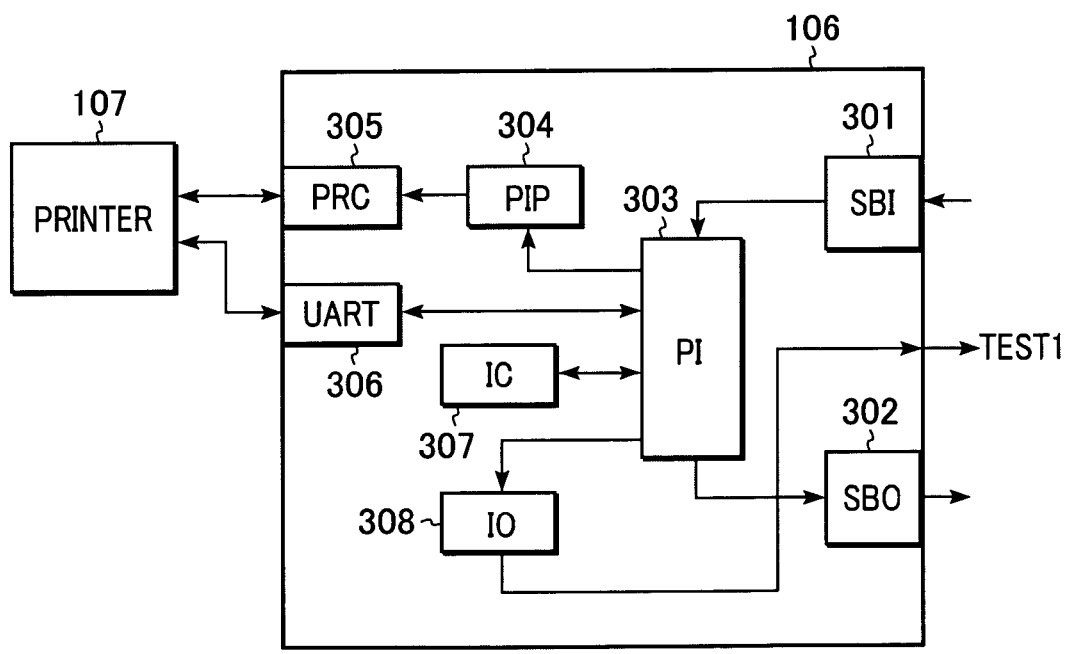
FIG. 12 is a diagram showing the structure of an image output processor according to the second embodiment.

FIG. 12 is a diagram showing the structure of the VO 106 according to the second embodiment, corresponding to FIG. 3. The IC 307 shown in FIG. 3 receives the TEST1 signal and, then, instructs the generation of the test packet to the PI 303. However, the VO 106 shown in FIG. 12 includes an input/output port (hereinafter, referred to as an I/O) 308 and the I/O 308 operates so that the TEST1 signal is asserted in accordance with the instruction from the PI 303 which receives the test packet.

Figure 13:
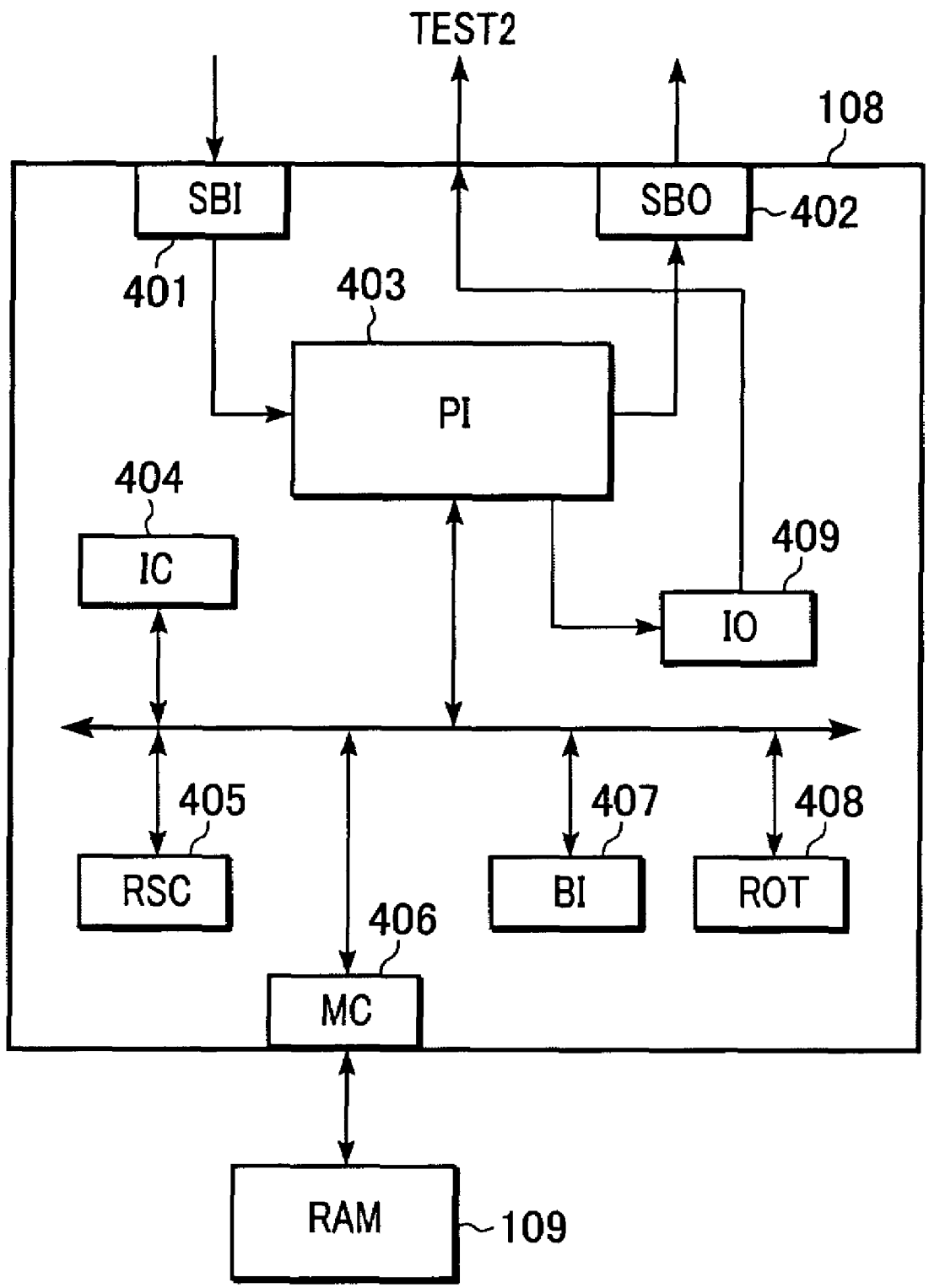
FIG. 13 is a showing the structure of an imaging processor according to the second embodiment.

FIG. 13 is a diagram showing the structure of the IP 108 according to the second embodiment, corresponding to FIG. 4. The IC 404 shown in FIG. 4 receives the TEST2 signal and, then, instructs the generation of the test packet to the PI 403. However, the IP 108 shown in FIG. 13 includes an input/output port (hereinafter, referred to as an I/O) 409, and the I/O 409 operates so that the TEST2 signal is asserted in accordance with the instruction from the PI 403 which receives the test packet.

Figure 14:
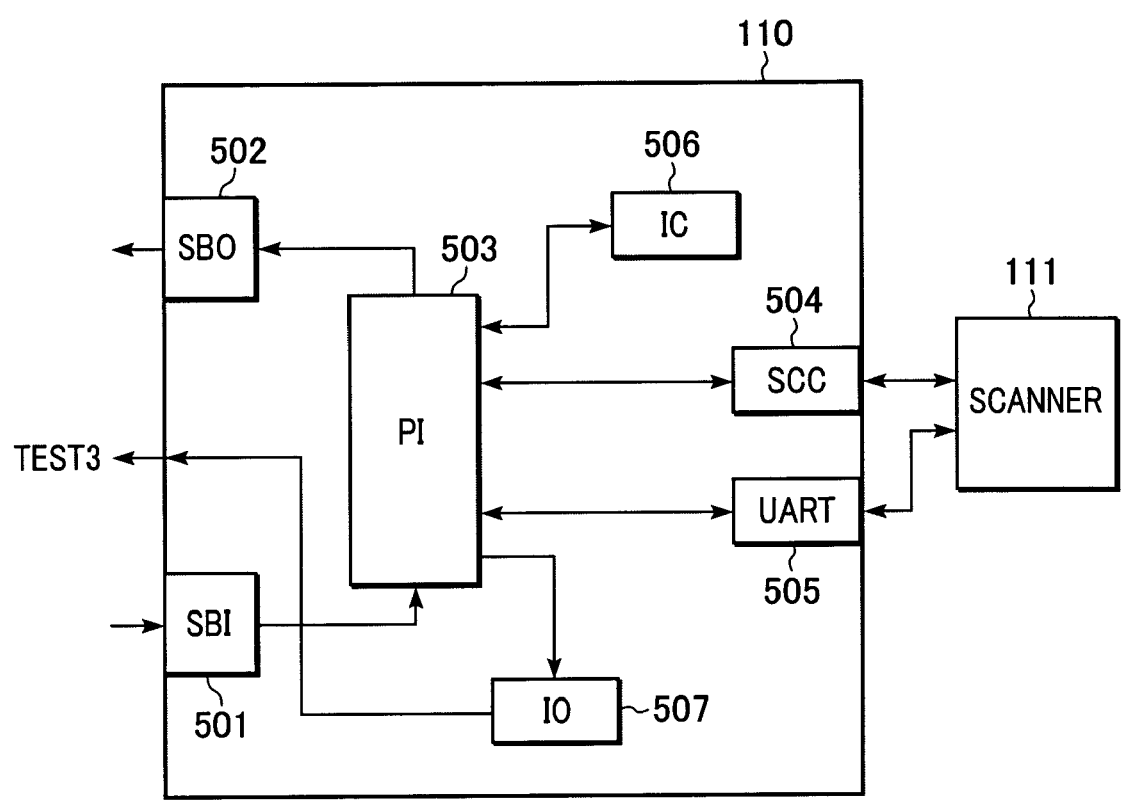
FIG. 14 is a diagram showing the structure of an image input processor according to the second embodiment.

FIG. 14 is a diagram showing the structure of the VI 110 according to the second embodiment, corresponding to FIG. 5. Referring to FIG. 5, the IC 506 receives the TEST3 signal and, then, instructs the generation of the test packet to the PI 503. However, referring to FIG. 14, the VI 110 has the input/output port (hereinafter, referred to as an I/O) 507 and the I/O 507 operates to assert the TEST3 signal in accordance with the instruction from the PI 503 which receives the test packet.

Figure 15:
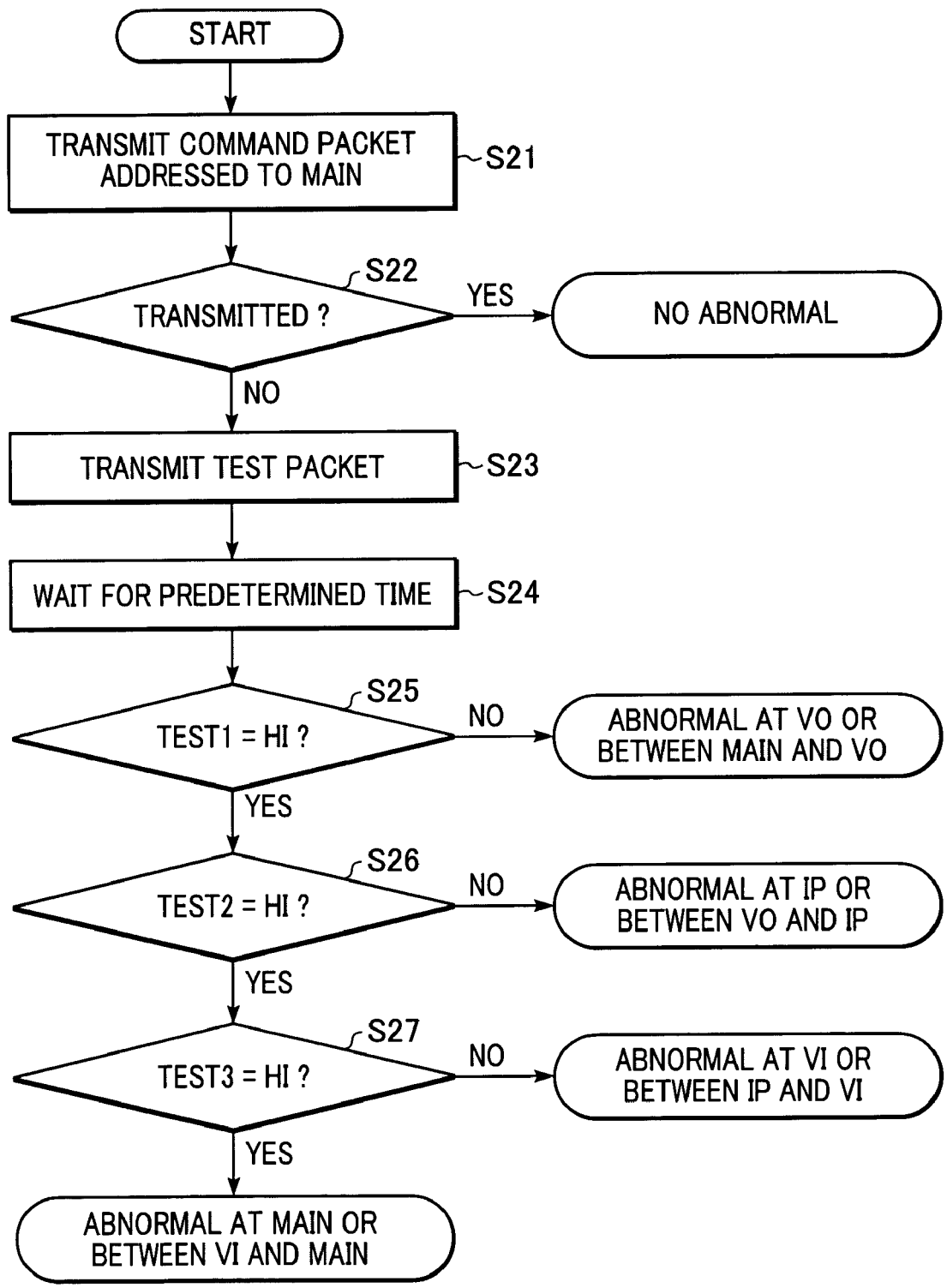
FIG. 15 is a flowchart showing fault diagnosis processing according to the second embodiment.

FIG. 15 is a flowchart showing the fault diagnosis processing according to the second embodiment. A program corresponding to the flowchart shown ion FIG. 15 is included in the program stored in the HD 104 and, as mentioned above, it is loaded to the RAM 102 and is executed by the CPU 201 in the MAIN 101.

First, the MAIN 101 transmits the command packet addressed thereto from the SBO 206 to the serial bus 100a (step S21). When the circuit connection is normal, the MAIN 101 recognizes that another processor has the packet data having the chip ID different from that of the MAIN 101 and the packet data is transmitted to the next processor. Thus, the packet data is to be returned to the SBI 207 in the MAIN 101.

Then, it is determined whether or not the transmitted packet data is normally returned (step S22). If it is determined that the packet data is normally returned, it is determined that "no abnormal". On the other hand, if it is determined that the packet data is not normally returned or that the packet data is broken, it is determined that any of the processors has a fault or the serial bus for connecting between the processors is abnormal. In this case, in the processing subsequent to step S23, the test packet is transmitted and, thereby, the transmission of the test signal from the sub-processors causes the test of the processors and of the connection between the processors. The MAIN 101 transmits the test packet with the structure shown in FIG. 8 to the serial bus 112a (step S23).

The test packet is a specific packet for diagnosis which is defined by the packet type 04H in the header portion. The sub-processor receives the packet and, then, detects the test mode. Further, it is tested whether or not the test data portion matches the data which is previously stored. When it is confirmed that the test data portion is correctly received, the TEST signal is asserted and the test packet is transferred to the next processor.

The VO 106 receives the test packet and, then, the PI 303 instructs the I/O 308 to assert the TEST1 signal and transmits the test packet from the SBO 302 to the next IP 108. Similarly, the PI 403 of the IP 108 receives the test packet and, then, allows the I/O 409 to assert the TEST2 signal and transmits the test packet from the SBO 402. Further, the VI 110 receives the test packet and, then, the PI 503 allows the I/O 507 to assert the TEST3 signal and transmits the test packet from the SBO 502.

When the MAIN 101 transmits the test packet in step S23, it waits for a predetermined time (step S24). By checking the levels (statuses) of the TEST1, TEST2, and TEST3 signals from the input ports, it is determined whether or not the VO 106, the IP 108, and the VI 110 normally receive the packet data for test.

In step S25, it is checked to see if the TEST1 signal from the VO 106 has the high level (referred to as an HI). When the TEST1 signal does not have the HI, it is determined that the operation of the VO 106 or the connection between the MAIN 101 and the VO 106 is abnormal. When the TEST1 signal is HI, it is determined that at least the operation of the VO 106 or the connection between the MAIN 101 and the VO 106 is not abnormal. Then, the processing sequence advances to step S26.

In step S26, it is checked to see if the TEST2 signal from the IP 108 is HI. When it is determined that the TEST2 signal is not HI, the operation of the IP 108 or the connection between the VO 106 and the IP 108 is abnormal. When it is determined that TEST2 signal is HI, it is determined that at least the operation of the IP 108 or the connection between the VO 106 and the IP 108 is not abnormal and the processing sequence advances to step S27.

In step S27, it is determined whether or not the TEST3 signal from the VI 110 is HI. When it is determined that the TEST3 signal is not HI, it is determined that the operation of the VI 110 or the connection between the IP 108 to the VI 110 is abnormal. When it is determined that the TEST3 signal is HI, it is determined that the operation of the MAIN 101 or the connection between the VI 110 and the MAIN 101 is abnormal.

As mentioned above, according to the second embodiment, the fault portion is specified by determining whether or not the test signal is received from the sub-processor in accordance with the test packet for a predetermined time. Consequently, even in a state in which the sub-processor does not transmit the command packet from the MAIN 101 to the unit at the latter stage via the serial bus, the interrupt packet for test is generated in the sub-processor in accordance with the instruction of the MAIN 101 via the signal line and it is transmitted to the serial bus. Therefore, the interrupt packet for test is transmitted to the serial bus at the latter stage and thus it is checked to see if the communication interface normally functions with the processor at the latter stage and the abnormal state is specified.

A brief description is given of the fault diagnosis processing of the electronic device according to the second embodiment. That is, the electronic device comprises the main processor for entirely controlling the electronic device and the sub-processors for executing the specific functions, which are connected to each other in a loop by a one-way bus. Further, the electronic device comprises the signal line for transmitting the test signal from the sub-processors to the main processor, unlike the one-way bus. In the fault diagnosis processing, first, the main processor transmits the predetermined packet data to the one-way bus, and determines whether or not the fault exists at any portion in the electronic device in accordance with whether or not the packet data is normally returned to the main processor. Next, when it is determined that the fault exists, the test packet is transmitted to the one-way bus and the fault portion in the electronic device is specified based on the state of the test signal which is transmitted via the corresponding signal line from the sub-processor in accordance with the test packet.

According to the first and second embodiments, the digital color copying machine is described as the examples. However, the present invention is not limited to these, and can widely be applied to electronic devices including a computer device and various image processing apparatuses in which a plurality of processors realize a predetermined function in cooperation therewith.

Other Embodiments

The first and second embodiments of the present invention are described in detail as mentioned above. However, the present invention can be applied to a system comprising a plurality of devices or an apparatus comprising a single device. Further, the present invention can be applied to the fault diagnosis method of the electronic device.

The present invention is accomplished by directly or remotely supplying, to a system or an apparatus, the program (corresponding to the flowchart shown in FIG. 9 or FIG. 15) of software for realizing the functions of the first and second embodiments and by reading and executing the supplied program code by a computer in the system or apparatus. In this case, any format having the program functions can be used.

Therefore, the present invention is realized by the program code installed to the computer so as to realize the functions and processing of the present invention by the computer. That is, the claims of the present invention include the computer program for realizing the functions and the processing of the present invention.

In this case, any program format having the above functions can be used, e.g., object code, a program executed by an interpreter, script data supplied to an OS, etc.

As for a recording medium to supply the program, it is able to use a floppy disk, hard disk, optical disk, magneto-optical disk, MO, CD-ROM, CD-R, CD-RW, magnetic tape, nonvolatile memory card, ROM, DVD (DVD-ROM, DVD-R), and the like.

In addition, as a method for supplying the program, a homepage on the Internet is accessed by using a browser of a client computer, and the computer program of the present invention is supplied by the homepage or a compressed file including an automatic install function is loaded to the recording medium such as a hard disk. Further, the program code forming the program of the present invention is divided into a plurality of files and the files are downloaded from the different homepages. That is, the claims of the present invention include a WWW server which allows a plurality of users to download the program file for executing the functions and the processing of the present invention by the computer.

The program of the present invention is enciphered, is stored in a storage medium such as a CD-ROM, and is distributed to users. Key information for decipher on a homepage via the Internet is downloaded by the user which passes a predetermined condition, and the enciphered program is executed by using the key information and is installed to the computer.

The functions of the aforementioned embodiment can be effected not only by executing the program which is read out by the computer, but also by executing a part or all of the actual processing on the OS (Operating System) which operates on the computer based on the instruction of the program.

In addition, the functions according to the first and second embodiments are executed by the program read from the recording medium to a memory included in a function expansion board inserted in the computer or a function extension unit connected to the computer and by thereafter entirely or partly executing the actual processing based on the instruction of the program by the CPU of the function expansion board or the function extension unit.

According to the embodiments of the present invention, it is possible to provide the electronic device in which the portion having the fault is easily specified when a plurality of processors are connected in a loop by the one-way bus.

It is to be understood that the phraseology or terminology employed herein in for the purpose of description and not of limitation. While the invention has been described with reference to the structures disclosed herein, it is not confined to the details set forth and this application is intended to cover such modifications or changes as may come within the purposes of the improvements or the scope of the following claims.

What is claimed is:

1. An electronic device having a main processing unit and a plurality of sub-processing units, wherein each of the main processing unit and the plurality of sub-processing units includes a first bus-connecting unit for connecting a bus for data input, a second bus-connecting unit for connecting a bus for data output, and means for processing a process request packet directed to itself, and for bypassing a process request packet, directed to the other one and input from the first bus-connecting unit, to the second bus-connecting, and wherein the main processing unit further includes a signal terminal for sending test signals to each of the plurality of sub-processing units, the signal terminal being directly connected to each of the plurality of the sub-processing units, and wherein upon receiving the test signal, each of the plurality of sub-processing units outputs an interrupt packet via the second bus-connecting unit, and wherein a data bus in a loop is formed that connects the main processing unit and the sub-processing units, said electronic device comprising:

determining means for outputting, to the second bus-connecting unit in the main processing unit, a command packet bypassed by all of the plurality of sub-processing units, and returned to the first bus-connecting unit of the main processing unit, to determine whether an error exists on the data bus in the loop, and identifying means for, in a case where an error exists, sending the test signal to each of the sub-processing units via the signal terminal of the main processing unit, wherein the identifying means determines whether the interrupt packet for the test signal has been received in order to identify a location of said error.

2. An electronic device according to claim 1, wherein, in a case where the error is determined by said determining means, said identifying means performs the processes of sending the test signal and determining the reception of the interrupt packet from the sub-processing units in order, beginning from the sub-processing unit arranged in a downstream in the ioop connection, and, thereby, identifies the error location.

3. An electronic device having a main processing unit and a plurality of sub-processing units, wherein each of the main processing unit and the plurality of sub-processing units includes a first bus-connecting unit for connecting a bus for data input, a second bus-connecting unit for connecting a bus for data output, and means for processing a process request packet, directed to itself and input from the first bus-connecting unit, in accordance with the request, and for bypassing a process request packet, directed to the other one and input from the first bus-connecting unit, to the second bus-connecting unit, and wherein the main processing unit further includes a signal terminal for test signals to be received from each of the plurality of sub-processing units, the signal terminal being directly connected to each of the plurality of the sub-connecting units, and wherein each of the plurality of sub-processing units further includes a test signal output unit for outputting a test signal to the main processing unit when an interrupt packet for test has been received via the first bus-connecting unit, and wherein a data bus in a loop is formed upon the mutual connection to each of the main processing unit and the plurality of sub-processing units via the each first bus-connecting unit and the each second bus-connecting unit, said electronic device comprising:

determining means for outputting, to the second bus-connecting unit in the main processing unit, a command packet bypassed by all of the plurality of sub-processing units, determining whether the command packet has been received from the first bus-connecting unit of the main processing unit, and for determining whether an error exists on the data bus in the loop, and identifying means for, in a case where the error is determined by said determining means, sending the interrupt packet for the test signal to the second bus-connecting unit of the main processing unit, determining whether the interrupt packet has been received, and identifying a location of the error.

4. An electronic device according to claim 3, wherein, in a case where the error is determined by said determining means, said identifying means performs the processes of sending the interrupt packet and determining the reception of the interrupt packet to the sub-processing units in order from the sub-processing unit arranged in a downstream in the loop connection, and, thereby, identifies the error location.

5. A method for diagnosing an error in an electronic device having a main processing unit and a plurality of sub-processing units, wherein each of the main processing unit and the plurality of sub-processing units includes a first bus-connecting unit for connecting a bus for data input, a second bus-connecting unit for connecting a bus for data output, and means for processing a process request packet, directed to itself and input from the first bus-connecting unit, in accordance with the request, and for bypassing a process request packet, directed to the other one and input from the first bus-connecting unit, to the second bus-connecting unit, and wherein the main processing unit further includes a signal terminal for test signals to be sent to each of the plurality of sub-processing units, the signal terminal being directly connected to each of the plurality of the sub-connecting units, and wherein each of the plurality of sub-processing units further includes an input unit for inputting the test signal and an output unit for outputting an interrupt packet for test via the second bus-connecting unit when the test signal has been received, and wherein a data bus in a loop is formed upon the mutual connection to each of the main processing unit an the plurality of sub-processing units via the each first bus-connecting unit and the each second bus-connecting unit, said method comprising the steps of:

outputting, to the second bus-connecting unit in the main processing unit, a command packet bypassed by all of the plurality of sub-processing units, determining whether the command packet has been received or not from the first bus-connecting unit of the main processing unit, and for determining whether an error exists or not on the data bus in the loop, and sending, in a case where the error is determined by said determining means, the test signal to each of the sub-processing units via the signal terminal of the main processing unit, determining whether the interrupt packet for the test signal has been received or not, and identifying a location of the error.

6. A method according to claim 5, wherein, in a case where the error is determined in said determining step, said identifying step performs the processes of sending the test signal and determining the reception of the interrupt packet to the sub-processing units in order from the sub-processing unit arranged in a downstream in the ioop connection, and, thereby, identifies the error location.

7. A method for diagnosing an error in an electronic device having a main processing unit and a plurality of sub-processing units, wherein each of the main processing unit and the plurality of sub-processing units includes a first bus-connecting unit for connecting a bus for data input, a second bus-connecting unit for connecting a bus for data output, and means for processing a process request packet, directed to itself and input from the first bus-connecting unit, in accordance with the request, and for bypassing a process request packet, directed to the other one and input from the first bus-connecting unit, to the second bus-connecting unit, and wherein the main processing unit further includes a signal terminal for test signals to be received from each of the plurality of sub-processing units, the signal terminal being directly connected to each of the plurality of the sub-connecting units, and wherein each of the plurality of sub-processing units further includes a test signal output unit for outputting a test signal to the main processing unit when an interrupt packet for test has been received via the first bus-connecting unit, and wherein a data bus in a loop is formed upon the mutual connection to each of the main processing unit an the plurality of sub-processing units via the each first bus-connecting unit and the each second bus-connecting unit, said method comprising the steps of:

outputting, to the second bus-connecting unit in the main processing unit, a command packet bypassed by all of the plurality of sub-processing units, determining whether the command packet has been received or not from the first bus-connecting unit of the main processing unit, and for determining whether an error exists or not on the data bus in the loop, and sending, in a case where the error is determined by said determining means, the interrupt packet for the test signal to the second bus-connecting unit of the main processing unit, determining whether the interrupt packet has been received or not, and identifying a location of the error.

8. A method according to claim 7, wherein, in a case where the error is determined in said determining step, said identifying step performs the processes of sending the interrupt packet and determining the reception of the interrupt packet from the sub-processing units in order from the sub-processing unit arranged in a downstream in the loop connection, and, thereby, identifies the error location.

9. A method for determining the location of an error within an electronic device having a main processing and first and second sub-processing units, wherein the main processing unit and first sub-processing unit are coupled by a first data bus, and wherein the first and second sub-processing units are coupled by a second data bus, and the second and main sub-processing units are coupled by a third data bus, the method comprising:

generating a data packet from the main processing unit via the first, second and third data buses back to the main processing unit;

determining that an error exists if the data packet is not returned to the main processing unit within a predetermined time;

in the case that said error exists, generating a test signal via direct connections from the main processing unit to each of the first and second sub-processing units; and transmitting a test packet from each of said sub-processing units via the second and third data buses to the main processing unit in order to determine the location of said error.

* * * * *